L. K. STEPHENS.
COTTON GIN.
APPLICATION FILED JUNE 14, 1913.

1,125,203.

Patented Jan. 19, 1915.

2 SHEETS—SHEET 1.

WITNESSES:
C. H. Walker,
J. H. Boyden.

INVENTOR.
L. K. Stephens,
BY
A. D. Jackson
ATTORNEY.

L. K. STEPHENS.
COTTON GIN.
APPLICATION FILED JUNE 14, 1913.

1,125,203.

Patented Jan. 19, 1915.
2 SHEETS—SHEET 2.

WITNESSES:

INVENTOR.
L. K. Stephens,
BY
A. L. Jackson,
ATTORNEY.

UNITED STATES PATENT OFFICE.

LOUIS K. STEPHENS, OF DALLAS, TEXAS.

COTTON-GIN.

1,125,203.  Specification of Letters Patent.  Patented Jan. 19, 1915.

Application filed June 14, 1913. Serial No. 773,645.

*To all whom it may concern:*

Be it known that I, LOUIS K. STEPHENS, a citizen of the United States, residing at Dallas, in the county of Dallas and State of Texas, have invented certain new and useful Improvements in Cotton-Gins, of which the following is a specification.

My invention relates to cotton gins, and more particularly to the construction and disposition of the gin saws and the object is to construct the saws in sections and to dispose the saws in such manner as to reach all the cotton that comes within the peripheries of the saws or within the plane of the peripheries of the saws.

In the gins in use there is a considerable space between each two gin saws. Cotton that comes within the plane of the saws, but in the spaces between the saws, is not instantly caught by the saws as is the cotton which comes directly in the paths of the saw-teeth.

The object of this invention is to dispose the saws in such position that the teeth of the saws will run through the entire space within the plane of the saw-teeth.

Another object is to make the saw cylinder in a single piece or block of wood and dispense with the wooden rings which are usually placed between the saws.

Another object is to improve the feeding of the cotton to the saws, the gin being particularly adapted to re-gin lint cotton.

Other objects and advantages will be fully explained in the following description, and the invention will be more particularly pointed out in the claims.

Reference is had to the accompanying drawings which form a part of this application.

Figure 1:
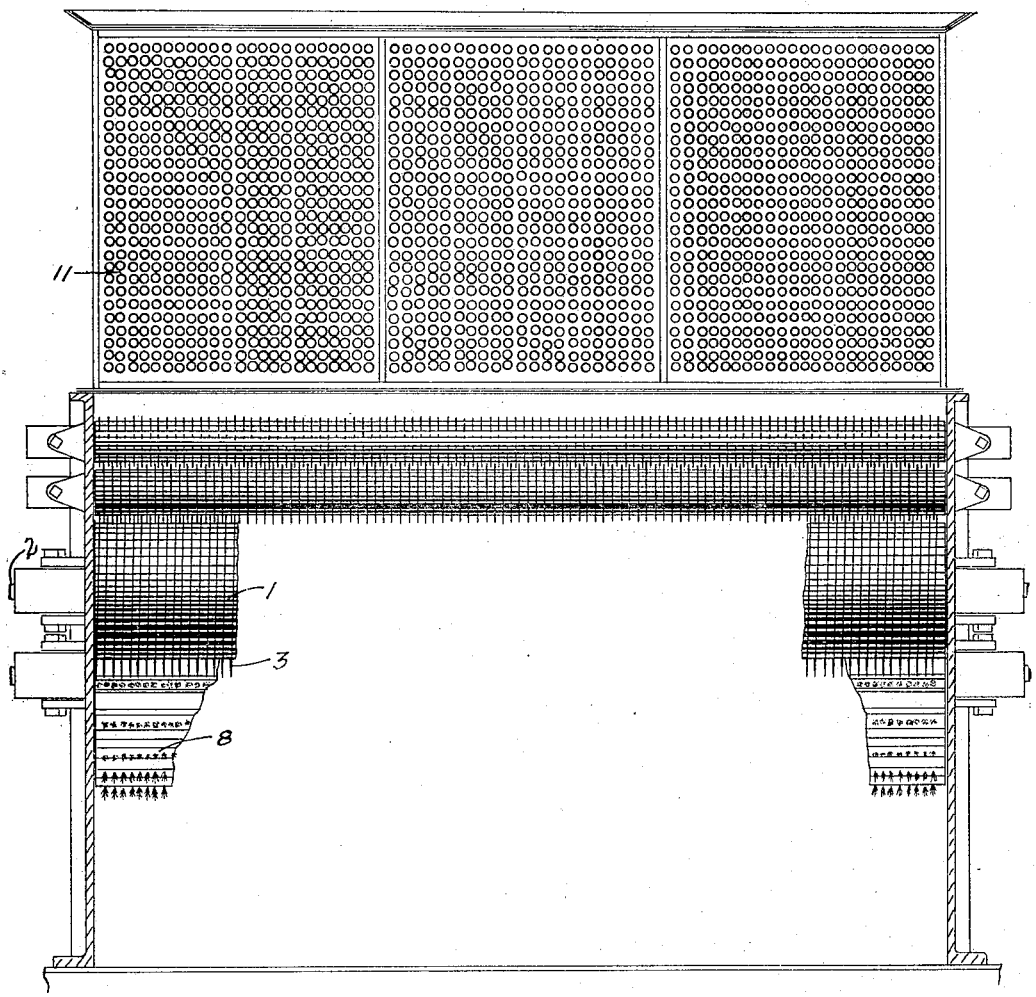
Figure 3:
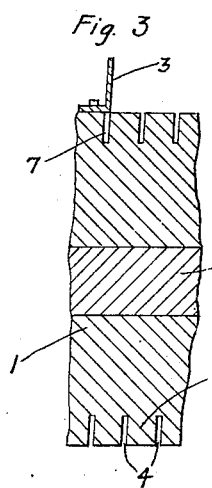
Figure 4:
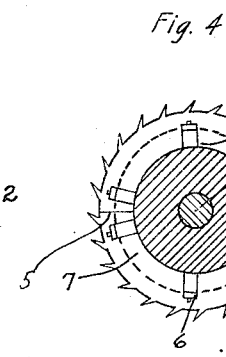
Figure 2:
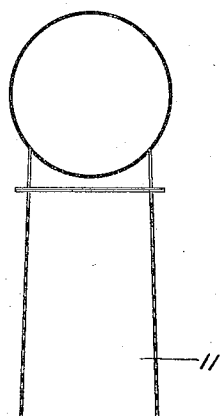
Figure 5:
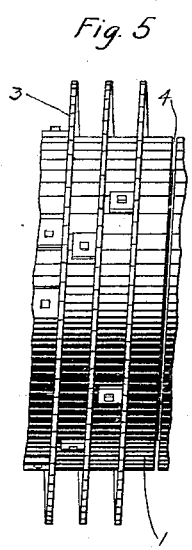
Figure 6:
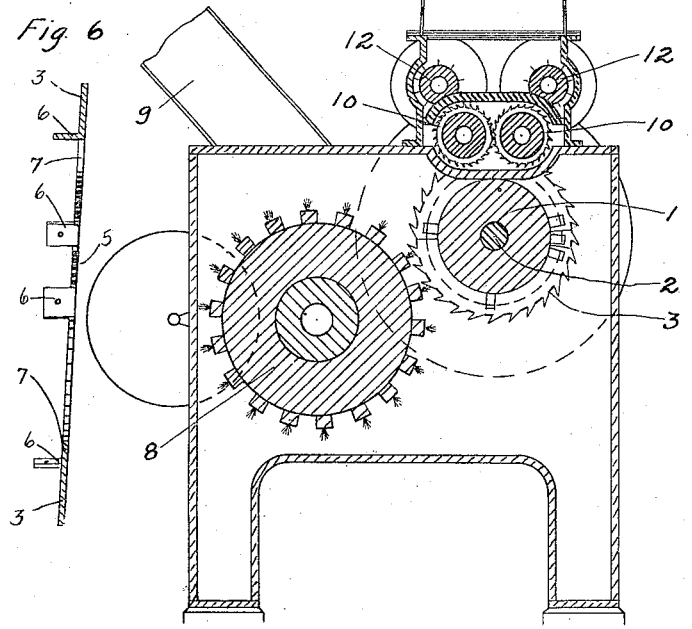

Figure 1 is a front elevation of the gin and the feeding rolls. Fig. 2 is a vertical cross-section of a saw cylinder and the accompanying parts. Fig. 3 is a broken section of a cylinder and a portion of one saw. Fig. 4 is a cross-section of a saw cylinder, showing the manner of mounting a saw thereon. Fig. 5 is a portion of a saw cylinder with three turns of the saw mounted thereon, the view being an enlarged view. Fig. 6 is a diametrical section of a saw, showing the lugs for attaching the saw section to the cylinder.

Similar characters of reference are used to indicate the same parts throughout the several views.

The arrangement of the gin is the same as the cotton gins in general use and for this reason, description and illustration of the frame and gearing and other parts will be omitted.

The saw cylinder 1 may be mounted on a shaft 2 which is journaled in suitable bearings of ordinary type. The saw cylinder 1 is constructed of a single block of wood and saw sections 3 are mounted in a spiral groove 4 in the periphery of the cylinder. The saw sections are not set at right-angles to the cylinder, as in other gins, but are set in the spiral groove and make a helical arrangement. The groove 4 should be just wide enough to receive the saw sections so that the saw will be rigid with the cylinder 1. On account of the construction of the spiral groove in the cylinder instead of the separate blocks of the ordinary gin saw cylinder, a number of sections are formed into a single spiral saw. Each section is made to extend less than one hundred and eighty degrees in the groove about the cylinder so that the attaching screw will not come in the same line longitudinally on the cylinder. If the screws should come in the same line, they might come in the same grain of wood and split the cylinder.

Figs. 3, 4 and 5 show the relative depth of the groove 4 in the wooden cylinder 1. The blades or saw sections extend to the bottom of the groove 4, but portions are cut from the sections and sprung out of the plane of the sections to form anchoring lugs 6 to be attached to the periphery of the cylinder by screws. The parts 7 which are not cut away project to the bottom of the groove 4. The lugs 6 are bent at right-angles to the face of the saw sections to be attached to the periphery of the cylinder. The groove 4 should be just deep enough to receive the parts 7 of the saw sections so that when the saw sections are inserted in the groove 4 and the anchoring lugs 6 secured to the cylinder, the edges of the sections meeting each other closely, a practically continuous spiral saw is formed extending from end to end of the saw cylinder, and the spiral saw will be rigid with the cylinder 1. It is plain that the saw teeth will cut through all the space within the plane of the spiral saw, that is, through the periphery of this space. All of the cotton that comes within the plane of the saw teeth will be acted upon by the saw teeth. The spiral saw is to be used in ordinary gin stands which are provided with brush drums 8, a lint chute 9, a feed chute 11, and two pairs of rollers 10 and 12 which feed the cotton from the receiving chute 11 to the saw 3. The rollers 12 are provided with picker teeth and the rollers 10 are provided with saws which may be constructed in sections similar to the saw sections above described.

The gin saw above described is particularly adapted to re-gin lint cotton and various changes may be made in the construction of the various parts without departing from my invention.

What I claim is:—

1. A cotton-gin having a cylinder of a single piece of material provided with a spiral groove in the periphery thereof, a shaft for said cylinder, saw-sections mounted in said groove, and anchoring lugs projecting from the faces of said sections and secured to the periphery of said cylinder.

2. A cotton-gin having a cylinder of a single piece of material provided with a spiral groove in the periphery thereof, a shaft for said cylinder, saw-sections of less than 180° mounted in said groove with the edges of two adjacent sections meeting each other, and anchoring lugs projecting from the faces of said sections and secured to the periphery of said cylinder.

In testimony whereof, I set my hand in the presence of two witnesses, this 14th day of May, 1913.

LOUIS K. STEPHENS.

Witnesses:
T. J. NORWOOD,
CHAS. R. P. POOL.

Copies of this patent may be obtained for five cents each, by addressing the "Commissioner of Patents, Washington, D. C."